(12) United States Patent
Starr (10) Patent No.: US 6,606,606 B2
(45) Date of Patent: Aug. 12, 2003

(54) SYSTEMS AND METHODS FOR PERFORMING INTEGRATED FINANCIAL TRANSACTION

(75) Inventor: Barry Starr, Winchester, MA (US)

(73) Assignee: OneCore Financial Network, Inc., Boston, MA (US)

( * ) Notice: Subject to any disclaimer, the term of this patent is extended or adjusted under 35 U.S.C. 154(b) by 12 days.

(21) Appl. No.: 09/437,000

(22) Filed: Nov. 9, 1999

(65) Prior Publication Data

US 2002/0062270 A1 May 23, 2002

Related U.S. Application Data (60) Provisional application No. 60/107,731, filed on Nov. 9, 1998.

(51) Int. Cl.$^7$ .............................................. G06F 17/60
(52) U.S. Cl. ............................. 705/35; 705/36; 705/39; 705/42
(58) Field of Search ............................. 705/35, 36, 42, 705/39, 40; 709/217–219

(56) References Cited

U.S. PATENT DOCUMENTS

| | | | |
|---|---|---|---|
| 4,694,397 A | 9/1987 | Grant et al. ................ | 364/408 |
| 4,799,156 A | 1/1989 | Shavit et al. ............... | 364/401 |
| 5,117,356 A | 5/1992 | Marks ......................... | 364/406 |
| 5,220,501 A | 6/1993 | Lawlor et al. .............. | 364/408 |
| 5,424,938 A | 6/1995 | Wagner et al. ............. | 364/408 |
| 5,483,445 A | 1/1996 | Pickering ................... | 364/406 |
| 5,644,724 A | 7/1997 | Cretzler ...................... | 395/219 |
| 5,644,727 A | 7/1997 | Atkins ........................ | 395/240 |
| 5,677,955 A | 10/1997 | Doggett et al. ............ | 380/24 |
| 5,710,889 A * | 1/1998 | Clark et al. ................ | 705/35 X |
| 5,717,868 A | 2/1998 | James ......................... | 364/401 |
| 5,740,271 A | 4/1998 | Kunkler et al. ............ | 382/137 |
| 5,764,955 A | 6/1998 | Doolan ....................... | 395/500 |

(List continued on next page.)

FOREIGN PATENT DOCUMENTS

| WO | WO 9838558 | * | 9/1998 |
|---|---|---|---|

OTHER PUBLICATIONS

No Author, "TNE Extends Services with Java–based Software" Insurance & Technology, p.8, Nov. 1997.*
No Author, "Banks will Compete in Housing Mortgage Switching Market Hong K: Some Banks Start Offering Switching Mortgage Loans to Customers who have already Borrowed Mortgage Loans" Sing Tao Daily, Jun. 14, 1997 abstract.*
Brooks, "Shopping at the Money Mall Offers OnMoney One–Stop Financial Services on the Internet" Wall Street & Technology Oct. 1997, p. 114.*
No Author, "Booz–Allen & Hamilton Study Indicates Corporate Banking Embracing the Internet" M2 Presswire, Apr. 9, 1997.*

(List continued on next page.)

Primary Examiner—M. Kemper
(74) Attorney, Agent, or Firm—Foley Hoag LLP (57) ABSTRACT

The invention provides a tool kit for a small business owner to manage a plurality of different financial accounts and services and to perform a number of different financial transactions, wherein each of the transactions may involve multiple sub-transactions which occur among different financial service providers. For example, the system provides an integrated package that integrates financial service providers, such as a payroll service provider, a retirement plan service provider, a healthcare service provider or another type of service provider. The system provides one interface to a subscriber and the subscriber can select from the interface a financial transaction to perform, wherein the selected transaction involves a plurality of subtransactions, occurring between the system, and the involved financial service providers.

18 Claims, 6 Drawing Sheets

U.S. PATENT DOCUMENTS

| | | | |
|---|---|---|---|
| 5,774,553 A | | 6/1998 | Rosen .......................... 380/49 |
| 5,787,403 A | | 7/1998 | Randle ......................... 705/43 |
| 5,802,499 A | * | 9/1998 | Sampson et al. ............. 705/35 |
| 5,826,243 A | | 10/1998 | Musmanno et al. .......... 705/35 |
| 5,842,185 A | | 11/1998 | Cahancey et al. ............ 705/40 |
| 5,852,811 A | | 12/1998 | Atkins .......................... 705/36 |
| 5,875,435 A | | 2/1999 | Brown .......................... 705/30 |
| 5,884,285 A | | 3/1999 | Atkins .......................... 705/36 |
| 5,890,140 A | | 3/1999 | Clarck et al. ................. 705/35 |
| 5,903,881 A | | 5/1999 | Schrader et al. .............. 705/42 |
| 5,905,976 A | | 5/1999 | Mjolsnes et al. ............. 705/39 |
| 5,911,136 A | | 6/1999 | Atkins .......................... 705/36 |
| 5,913,202 A | * | 6/1999 | Motoyama ................... 705/35 |
| 5,920,848 A | * | 7/1999 | Schutzer et al. .............. 705/42 |
| 5,949,044 A | | 9/1999 | Walker et al. ............... 235/379 |
| 5,950,174 A | | 9/1999 | Brendzel ...................... 705/34 |
| 5,974,146 A | | 10/1999 | Randle et al. ................ 380/24 |
| 5,978,780 A | | 11/1999 | Watson ......................... 705/40 |
| 6,128,602 A | * | 10/2000 | Northington et al. ......... 705/35 |

OTHER PUBLICATIONS

"ExpressNet Bows (American Express Launches Online Service called ExpressNet)", Information Week, n514, p 17, (Feb. 13, 1995).

"American Express Services Go On Line", Mergers & Acquisitions, v29, n5, p8 (Mar./Apr. 1995).

International Search Report.

Bach J. Maurice; "The Design of the UNIX™ Operating System", Prentice Hall Software Series, Upper Saddle River, New Jersey (1986).

Johnson and Troan;"Linux Application Development",Addison–Wesley (1998).

Laurie & Laurie;"Apache: the Definitive Guide",Oreilly & Associates, Inc. (1997).

McGoveran & Date;"A Guide To Sybase and SQL Server", Addison–Wesley (1993).

Schneier Bruce;"Applied Cryptography"Addison–Wesley (1996).

Wall et al.;"Programming Perl",O'Reilly & Associates (1996).

* cited by examiner

SYSTEMS AND METHODS FOR PERFORMING INTEGRATED FINANCIAL TRANSACTION

CROSS REFERENCE TO RELATED APPLICATIONS

This case claims priority to U.S. Ser. No. 60/107,731, Nov. 9, 1998 entitled SYSTEMS AND METHODS FOR INTEGRATING FINANCIAL TRANSACTIONS, and naming Barry L. Starr, as an inventor, the contents of which are herein incorporated by reference.

FIELD OF THE INVENTION

The invention relates to systems and methods for providing small business owners with centralized control over transactions and accounts, and more particularly to systems, methods and software products that provide a user with control over a financial transaction that occurs between different financial service providers, including different online financial service providers.

BACKGROUND OF THE INVENTION

Online banking services promise individuals and small companies significant increases in the efficiency of managing business accounts and corporate financial transactions. The online banking industry is expected to grow significantly over the coming years as more and more small business begin to leverage the Internet as a ready mechanism for transferring funds, purchasing services and goods, and managing corporate accounts.

However, although the promise of efficient online financial services has been repeatedly made over the last several years, the online banking services that exist today are, in truth, incomplete and difficult to employ. As such existing online banking services fail to provide to small business and individuals those key factors that are necessary for a customer to achieve the efficiencies they require. These efficiencies include ease of use, the ability to delegate authority for performing financial transactions sufficient features to perform those transactions necessary for conducting the day to day business of a small company, and a simple and intuitive interface that allows a customer to readily perform the desired transaction.

Today there exist many online banking systems that allow a consumer, small business, or other entity to control, transfer, and monitor the funds maintained within a banking account. One such system is described in U.S. Pat. No. 5,220,501 which describes an online banking system that allows a user to control the funds within a checking account from a remote terminal, such as a computer system from a users home. Similarly, U.S. Pat. No. 5,903,881 describes a personal online banking system with integrated online statement and checkbook user interface that also provides an online banking system that allows a user to control their checking account from a remote location.

These systems generally work well for individuals interested in remotely monitoring their personal checking account, saving account or other personal bank accounts. Therefore such systems can be quite effective at helping an individual manage their personal finances.

However, the financial accounts of a small business are significantly more complicated than the financial accounts of an individual and can involve transactions for making payroll, 401K transactions, health insurance transactions, retirement plans, managing a plurality of corporate credit cards, and other such transactions. Its further common that a small business purchases different financial service from different financial service providers, either because no single service provider is capable of providing all the necessary or because there are economic advantages to choosing multiple service providers over a single financial service provider. Therefore it is quite common for a small business owner to utilize the banking services of one financial institution and the payroll services of a different financial service provider. Similarly, the same business may choose a special service provider to manage mutual funds and another financial service provider for securing corporate credit cards. Accordingly a small business can be left with a plurality of different SP, each of which may optionally provide online access to the company's account. Although the online access may provide the company with convenient access to that service provider's account information, the company is still left with having to manage a plurality of different accounts each of which has separate online access controls including different user interfaces, different passwords and different functions. Thus the user is left with having to administer a plurality service systems. This can be quite a cumbersome and labor intensive process one of which many companies find distracting from the main corporate mission. Moreover have a plurality of different accounts makes it difficult to delegate authority for administering a different accounts. For example, a small company may provide the company comptroller with access and authority to administer funds from the company's checking account, payroll, 401K plan, and other accounts. However, if the comptroller were to leave the company, the remaining corporate officers would be faced with having to go into each online service and change the user account information to remove the user account previously provided to the comptroller thereby insuring that the departed comptroller can no longer access corporate financial information.

Accordingly, although online financial services exist today these systems are generally cumbersome to employ and fail to provide a small business with the services required for managing the day to day financial transactions of the company. Accordingly there is a need in the arc for a system that provides a facile to use financial service that provides the small business with the tools and service required to manage the financial structure of the company. There is a further need for systems that provide a small business with central control over all the companies accounts or a plurality of the company's accounts thereby allowing he small business owner to grant or restrict access to company accounts readily.

SUMMARY OF THE INVENTION

The invention provides a tool kit for a small business owner to manage a plurality of different financial accounts to perform a number of different financial transactions, wherein each of the transactions involves multiple sub-transactions which occur among different financial service providers. For example, the system provides an integrated package that integrates financial service providers, such as a payroll service provider, a retirement plan service provider, a healthcare service provider or another type of service provider. The system provides one interface to a subscriber and the subscriber can select from the interface a financial transaction to perform. For example, one transaction that can be selected by the subscriber is to "Pay Payroll." Upon selecting this transaction at the user interface, the subscriber's computer sends an instruction to a webserver that coordinates transactions between different providers. The webserver interprets the instructions to pay payroll as an instruction to transfer money from a "Cash Money Account" (CMA) into a checking account, and from the checking account, deliver money to the payroll service provider for making the payroll. The systems and methods described herein perform the middle-level computing and processing that negotiates the financial transactions which are to occur through each of the service providers in order to perform this compound financial transaction. For example, the system can transmit to the CMA service provider instructions in a format understood by the CMA service provider and having the information necessary for the CMA service provider to transfer money from the CMA account into a cash account or savings account that can be employed by the payroll service provider. For example, the server can provide to the CMA financial service provider an instruction including information such as a user ID, a PIN number, the amount of money necessary for making payroll, an instruction representative of the account into which money should be transferred from the CMA account, and any other suitable information that the CMA service provider needs to transfer money from the CMA account. Similarly, the system can provide instructions to the payroll service provider that direct the payroll service provider to prepare payroll checks for each of the employees currently of record at the payroll service providers data center. Similarly, the server can provide to the payroll service provider information that is representative of a user ID number, a PIN number, an access control number, or any other type of information that is required by the payroll service provider to perform the financial transaction requested by the systems subscriber.

BRIEF DESCRIPTION OF THE DRAWINGS

The invention will be appreciated more fully from the following description with reference to the accompanying drawings wherein.

DETAILED DESCRIPTION OF CERTAIN ILLUSTRATED EMBODIMENTS

To provide an overall understanding of the invention, certain illustrative embodiments will now be described, including a system that allows an entity, such as an individual, a partnership, a small business, a trust fund, an accountant, or other such entity, to employ a uniform user interface to perform integrated financial transactions, and optionally, to generate records of such integrated financial transactions, wherein an integrated financial transaction will be understood to include, although not be limited to, a financial transaction that occurs between a plurality of financial service providers. It will be understood by one of ordinary skill in the art that the systems and methods described herein are provided merely for the purpose of providing examples of the operation and structure of systems and methods of the invention, and that the described embodiments and practices maybe adapted and modified to provide alternative systems and methods. Thus, it is to be understood that these other additions and modifications will not depart from the scope of the invention.

Figure 1:
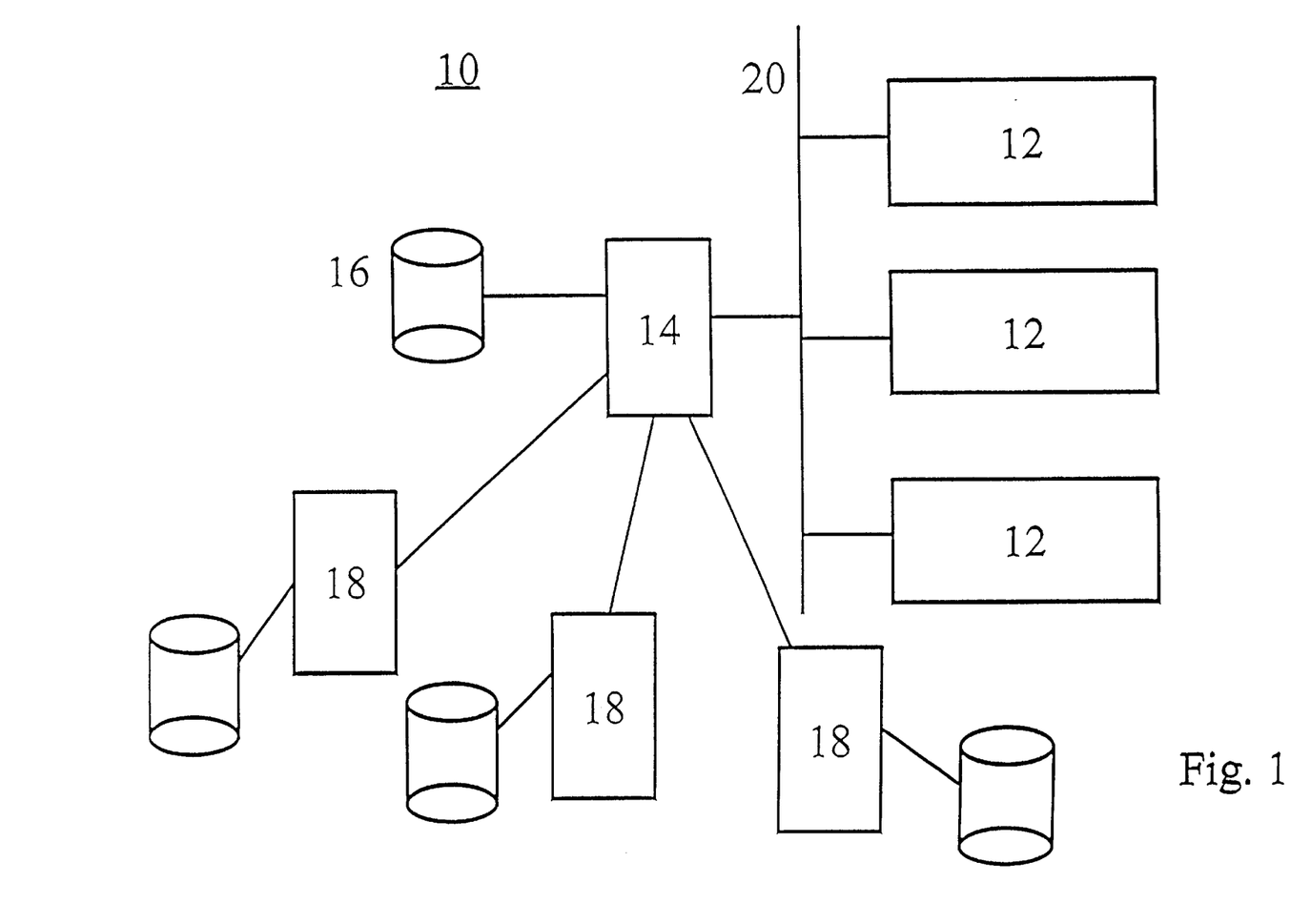
FIG. 1 depicts a functional block diagram of one system according to the invention.

FIG. 1 depicts one embodiment of a system 10 according to the invention for carrying out integrated financial transactions. Specifically, FIG. 1 illustrates a system 10 wherein a plurality of subscriber systems 12 connect through a network 20 to the server 14. The server 14 connects to a proprietary database 16 maintained by the server 14 and similarly connects, optionally by direct secure lines, to a plurality of financial service providers 18. The elements of the system 10 can include commercially available systems that have been arranged and modified to act as a system according to the invention, which allows a subscriber to carry out integrated financial transactions, and optionally generated records of these integrated transactions. The system 10 of FIG. 1 employs the Internet to allow a subscriber at a remote client, the subscriber systems 12, to access a central server, the depicted central server 14, to login to an account maintained by that server, and to employ the services provided to that account to perform financial transactions that are commonly required by a small business.

For example, the server 14 can present the subscriber with an HTML page that acts as a user interface. This user interface can present to the subscriber a set of controls for performing financial transaction typical for a small business. For example, the user interface can provide to the subscriber a control, typically a button on a web page, that directs the system to perform a payroll operation. For this transaction, upon activation of the user control, the server 14 can create instructions that can be followed by the different financial service providers that have a role in the payroll financial transaction. For example, the server can generate instructions for one financial service that provides money market funds, to transfer funds from a money market account into a checking account maintained by a different financial service provider. The server can further create instructions for this financial service provider that direct the transfer of funds to an account maintained by a payroll service provider. The server can then instruct the payroll service provider to deliver paychecks in the appropriate amounts to the small business for distribution to the employees. Thus by activating one control, the subscriber is able to perform the multiple financial transaction involved in the payroll process.

Turning now the elements that compose the system 10 depicted in FIG. 1, it can be seen the system 10 includes a network based system that includes a plurality of client systems 12 that connect through a network 20, such as the Internet IP network, or any suitable network to a server system, such as the server system 14 depicted in FIG. 1. The server 14 can connect over dedicated channels, over the Internet, or by other means, to the financial services providers 18.

For the depicted system 10, the client systems 12 can be any suitable computer system such as a PC workstation, a handheld computing device, a wireless communication device, or any other such device, equipped with a network client capable of accessing a network server and interacting with the server to exchange information with the server. In one embodiment, the network client is a web client, such as a web browser that can include the Netscape web browser, the Microsoft Internet explorer web browser, the Lynx web browser, or a proprietary web browser, or web client that allows the user to exchange data with a web server, and ftp server, a gopher server, or some other type of network server. Optionally, the client and the server rely on an unsecured communication path, such as the Internet, for accessing services on the remote server. To add security to such a communication path, the client and the server can employ a security system, such as any of the conventional security systems that have been developed to provide to the remote user a secured channel for transmitting data over the Internet. One such system is the Netscape secured socket layer (SSL) security mechanism that provides to a remote user a trusted path between a conventional web browser program and a web server. Therefore, optionally and preferably, the client systems 12 and the server system 14 have built in 128 bit or 40 bit SSL capability and can establish an SSL communication channel between the clients 12 and the server 14. Other security systems can be employed, such as those described in Bruce Schneir, Applied Crytpography (Addison-Wesley 1996). Alternatively, the systems may employ, at least in part, secure communication paths for transferring information between the server and the client. For purpose of illustration however, the systems described herein, including the system 10 depicted in FIG. 1 will be understood to employ a public channel, such as an Internet connection through an ISP or any suitable connection, to connect the subscriber systems 12 and the server 14.

The server 14 may be supported by a commercially available server platform such as a Sun Sparc™ system running a version of the Unix operating system and running a server capable of connecting with, or exchanging data with, one of the subscriber systems 12. In the embodiment of FIG. 1, the server 14 includes a web server, such as the Apache web server or any suitable web server. The web server component of the server 14 acts to listen for requests from subscriber systems 12, and to in response to such a request, resolves the request to identify a filename, script, dynamically generated data that can be associated with that request and to return the identified data to the requesting subscriber system 12. The operation of the web server component of server 14 can be understood more fully from Laurie et al., Apache The Definitive Guide, O'Reilly Press (1997). The server 14 may also include components that extend its operation to accomplish the integrated financial transactions described herein, and the architecture of the server 14 may vary according to the application. For example, the web server may have built in extensions, typically referred to as modules, to allow the server 14 to perform operations that facilitate the integrated financial transactions desired by a subscriber, or the web server may have access to a directory of executable files, each of which files may be employed for performing the operations, or parts of the operations, that implement the integrated financial transactions of the subscriber. Thus it will be understood that the server 14 may act as a financial transaction server according to the invention that configures the work station hardware supporting the server 14 to act as a system according to the invention.

The server 14 may couple to a database 16 that stores information representative of a subscriber's account, including information about the different financial service providers that the subscriber employs and information regarding the subscribers accounts, including passwords, user accounts, user privileges and similar information. The depicted database 16 may comprise any suitable database system, including the commercially available Microsoft Access database, and can be a local or distributed database system. The design and development of database systems suitable for use with the system 10, follow from principles known in the art, including those described in McGovern et al., *A Guide To Sybase and SQL Server,* Addison-Wesley (1993). The database 12 can be supported by any suitable persistent data memory, such as a hard disk drive, RAID system, tape drive system, floppy diskette, or any other suitable system. The system 10 depicted in FIG. 1 includes a database device 16 that is separate from the server station platform 14, however, it will be understood by those of ordinary skill in the art that in other embodiments the database device 16 can be integrated into the server 14.

The server 14 may also couple to a plurality of financial service providers 18. In the depicted embodiment, the server 14 connects to the financial service providers via a secure line, such as a leased telephone line. However, it will be apparent to those of ordinary skill in the art that other communication paths can be employed for exchanging data between the server 14 and the financial service providers 18. The financial service providers can be entities, or institutions that offer or support financial services to an individual or a business. For example, a financial service provider can include investment management firms that offer cash management accounts which combine check writing and debit card services with money market rates of interest and which are insured against loss or optionally value decline. Similarly, a financial service provider may include an electronic Bill Payment Service, such as the CheckFree™ service offered by the CheckFree Corporation, which provides the bill payment services and electronic billing services, and may include a Payroll Service, that allows a subscriber to submit its payroll online through its cash management account. Such services can also automatically pay and files taxes from this Account. One such service provider is Computer Resources, Inc. A financial service provider may be a 401(k) service that provides 401(k) plan management with online enrollment processes including process for setting up vesting schedules to matching programs, and with options to choose from a selection of mutual funds including for example Fidelity, Vanguard, and Janus. Further service providers may include providers that allow a business or individual to accept credit cards as payment from customers and have the proceeds electronically deposited into the appropriate account, including accounts that will immediately begin earning money market rates. Another example of a financial service provider will include a Leasing Service, for example BankVest Capital Corp., that allows upgrading and adding equipment, handling seasonal fluctuations, addressing unexpected cash flow interruptions and take advantaging of unanticipated opportunities. Additionally, a financial service provider may include a credit service, such as the Advanta MasterCard® service.

Figure 2:
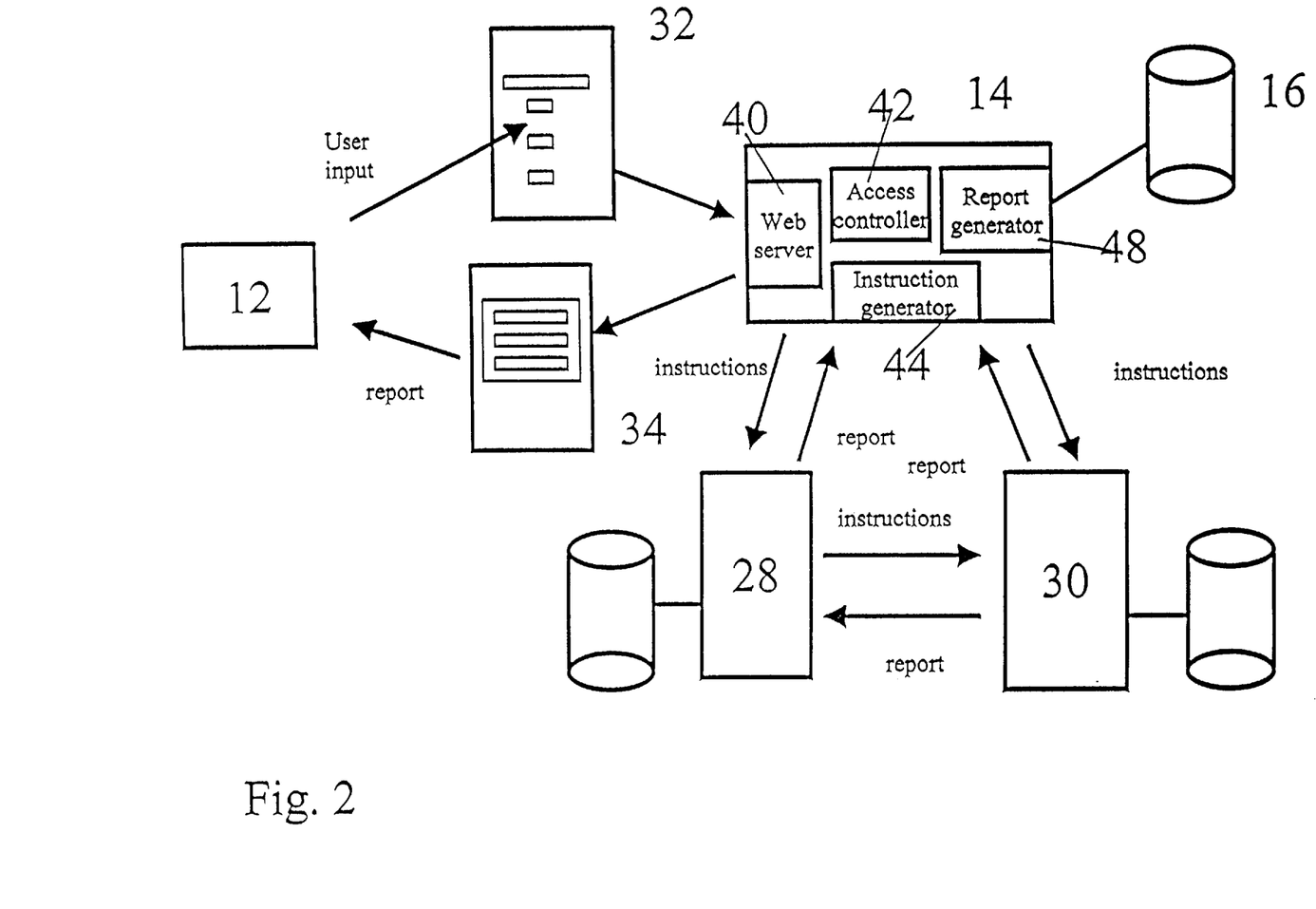
FIG. 2 depicts in more detail a system according to the invention.

FIG. 2 provides a functional block diagram of one server 14 for performing integrated financial transactions and further depicts the data flow diagram of one example of a subscriber's use of the server 14 to perform an integrated financial transaction between the financial service providers 28 and 30. Specifically, FIG. 2 depicts a data flow diagram wherein a subscriber 12 employs a user interface 32 to provide user input to the server 14. As can be seen from FIG. 2, the server 14 acts as middleware that coordinates the operations of the financial service providers 28 and 30 to allow perform a compound or integrated financial transaction, that involves the services of both these service providers. Specifically, the server 14 is as a functional block diagram that includes a web server 40, an access control module 42, an instruction generator 44 and a report generator 48. The web server 40 can be any suitable web server, as discussed above, and in this example, can be understood as the Apache web server listening to port 80 and having access to a set of executable files stored in a directory accessible to the web server 40 such as the cgi-bin directory.

Figure 3:
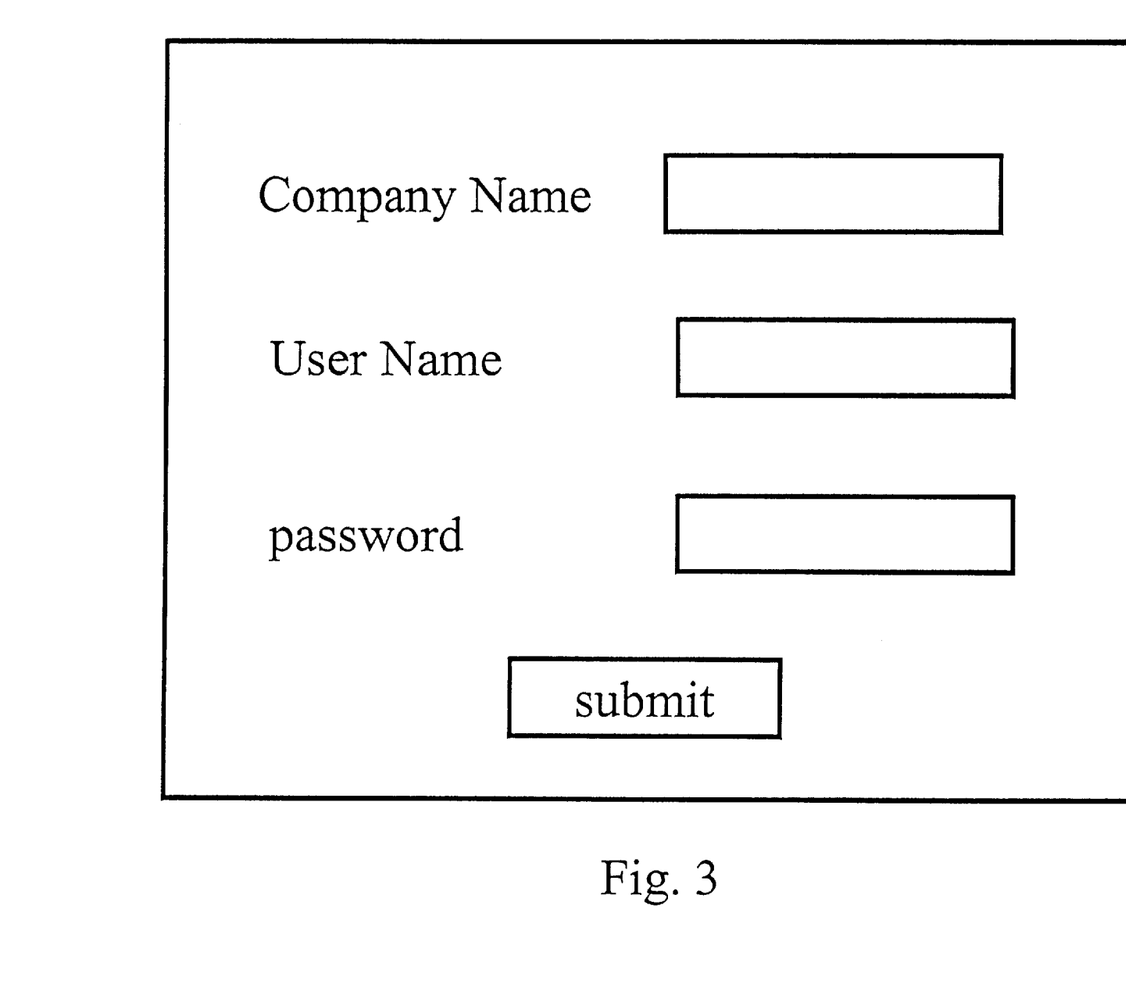
FIG. 3 depicts one example of an interface for collecting access information from a subscriber.

One such executable file may be a script that implements an access control process, to provide an access controller such as the depicted access controller 42. The access controller 42 can be a Perl V script, a C language program or any other suitable program for providing a process that can determine, in response to information provided by the subscriber, an access level to grant to the subscriber. For example, the access controller 42 may process identifier information such as a user name, company name and a password provided by the subscriber through an HTML form presented as the user interface 32. One such form is depicted in FIG. 3. The access controller 42 may compare the identifier information provided through the form with information stored in the database 16. From this comparison, the access controller can determine whether the company name, user name and password indicate that the subscriber has a valid account on the server 14.

Figure 4:
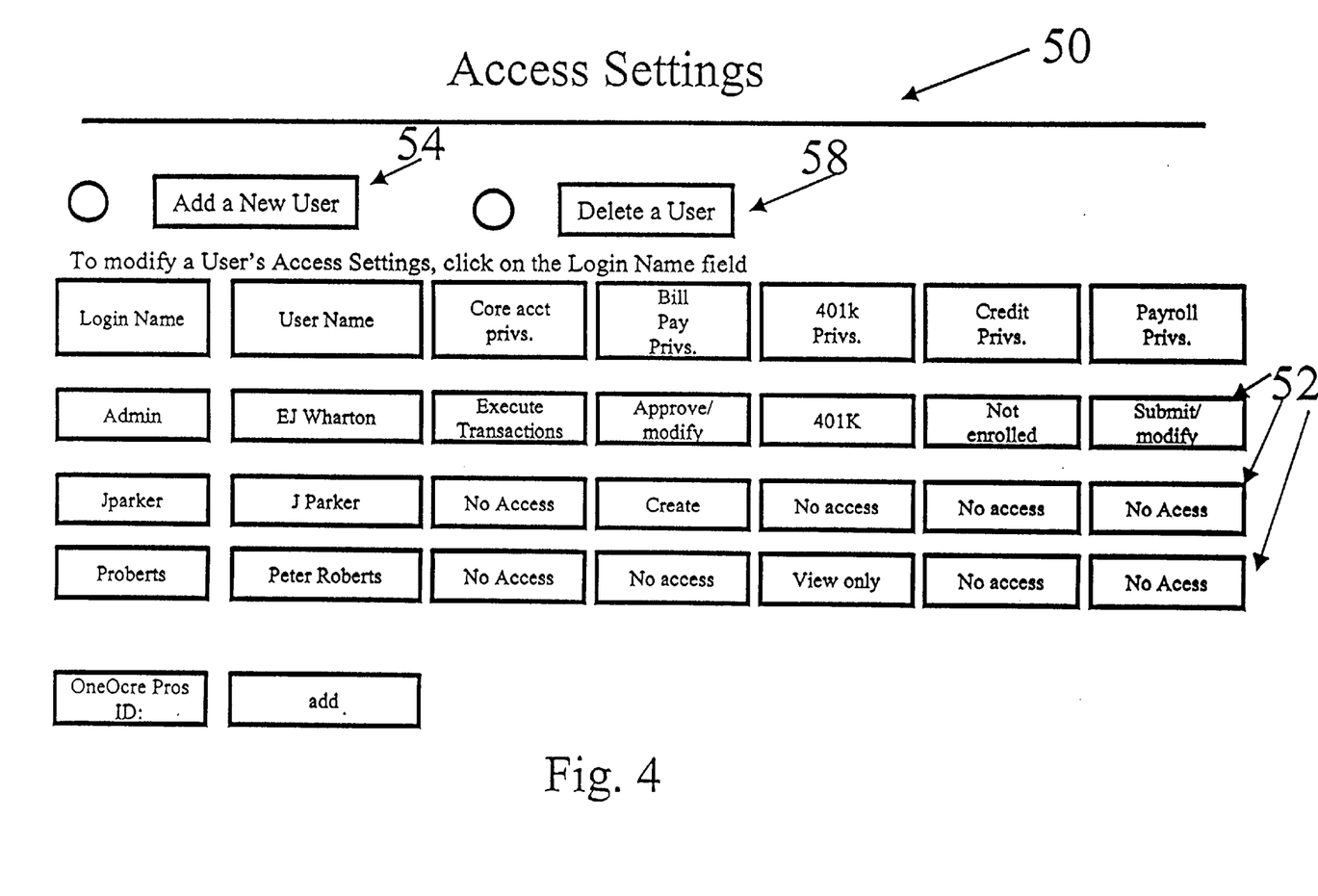
FIG. 4 depicts on example of an interface for controlling the access settings for various subscribers.

In optional embodiments, the access controller can determine the class of access to grant the subscriber. For example, in these optional embodiments, each account can have a root user that is capable of creating sub accounts on the server, each sub account having different levels of user privileges. For example, the root user, or admin, can provide certain users with read only access to the company account information. Further, the root user may restrict a subaccount user to certain transactions. Thus, the payroll person for the company may be allowed to employ the payroll service, but may be prevented from accessing the CMA account for general check writing privileges, or if check writing privileges are provided, the access control process may limit the amount that a sub user can write checks for, without first securing approval from the root user, or some other subuser. These types of restricted access are depicted in FIG. 4 which illustrates an Access Settings page 50, that can be an HTML page presented by the web server 40 to the root member of the subscriber account. The depicted HTML page can be generated in response to a data stream provided to the web server 40 by the access controller 42. As shown in FIG. 4, the Access Settings page 50 can present the root user with several fields 52, which present to the root user the level of access and types of rights provided to each user of the subscriber account. In the depicted example, the root user may access for any sub user any field associated with one of the services employed by the subscriber. Thus, for example the root user can access the Payroll Privileges field for the user "J Parker", to change or modify the users privileges for this service. Additionally, as depicted in FIG. 4, the root user can add new users through control 54, wherein subaccounts can be created, with the root user granting certain privileges to the subuser, and providing for the subuser an account name and password, that can be submitted by the subuser, and employed by the access controller 42 to allow the subuser to login to the system and access services. Additionally, the Access Settings page 50 provides a "delete User" field 58, that allows the root user to delete, optionally with just one or two clicks of a mouse device, a selected one of the user accounts. In response to indicating an account is to be deleted, the access controller 42 can delete the subusers account information, such as user name and password from the database 16, thereby preventing the subuser from being able to subsequently access the server 14. In a further optional embodiment, the access controller may also create a log of each users transactions, and maintain the log in file that can be viewed by the root user.

The design and development of the access controller follows from principles known in the art of computer programming, including those set forth in Wall et al., *Programming Perl, O'Reilly & Associates* (1996); and Johnson et al, *Linux Application Development*, Addison-Wesley (1998). Additionally, in other embodiments, the access controller 42 can be implemented, at least in part, by employing the operating system to restrict the execution of certain scripts and to restrict access to certain files by configuring the operating system in a selected manner. Techniques for so configuring the operating system are known in the art, including those techniques set forth in Bach, *The Design of the Unix Operating System*, Prentice-Hall (1986).

FIG. 2 further depicts that the server 14 may include an instruction generator 44 that acts to generate instructions that can direct the operations of the financial service providers, such as the depicted providers 28 and 32. In one embodiment, the instruction generator 44 may be an executable file, or group of executable files, that the web server 14 may access in response to user information and user commands. For example, upon logging onto the system, the web server 40 may present to the subscriber an HTML page that includes a number of controls each of which correspond to an available integrated financial transaction which the subscriber can activate. The subscriber can activate the integrated financial transaction by using the control, such as by clicking a button with a mouse. In response to the control being activated, the client browser can return to the web server a locator for an executable file that can perform, at least in part, the integrated financial transaction. For example, the instruction generator 44 can be an executable file, such as a Perl V script, a C language program or any other suitable program for providing a process that can generate instructions for a financial service provider, such as the depicted financial service providers 28 and 30, to achieve an integrated financial transaction for the subscriber.

For example, an continuing with the earlier described example, the subscriber 12 can employ a web browser to access the web server 40 component of the server 14 and to receive from the server 14 an HTML, XML, SGML or other suitable format document that can act as the user interface 32. In one example, the user interface 32 is an HTML page that employs the FORM tag/protocol for allowing a subscriber to transmit data to the server 14. For example, the user interface 32 can provide the subscriber 12 with a form that allows the subscriber 12 to enter a customer identifier and a password. The subscriber 12 submits the data to the server 14 and, as discussed above, the server 14 processes the data to determine whether the subscriber 12 is an authorized user and optionally the level of access to be granted to the subscriber 12.

Once the server 14 determines that the subscriber 12 can have access to an account maintained by the server 14 and can determine the level of access for the subscriber 12, the server 14 can update the user interface 32, by providing to the subscriber 12 a page, such as an HTML page, that presents to the subscriber 12 one or more user controls, typically button controls, that allow the subscriber 12 to direct the server 14 to perform an integrated financial transaction. For example, one button can provide the subscriber with a control that allows the subscriber 12 to direct the server 14 to perform a payroll operation for the company. Upon activating the control, the browser can deliver to the server 14, information representative of an instruction to make payroll.

Upon receiving the instruction, the server 14 may call a script that activates the instruction generator 44 which will direct and coordinate the different financial service providers to perform the tasks that comprise the payroll transaction. In a first act, the instruction generator 44 can access the database 16 to determine the financial service provider employed by the subscriber 12 to maintain the account for the company funds that are to be employed for making payroll. This information can include the information for accessing the financial service provider, such as the financial service provider 28 depicted in FIG. 2, which can be a CMA service provider that provides the subscriber with a money market account for storing company finds. The information retrieved from the database 16 can include the information for accessing the financial service provider 28, such as a telephone number for a leased line that may be employed for accessing on-line services offered by the financial service provider 28. In alternative embodiments, the instruction generator 44 can retrieve from the database 16 a URL for accessing on line services though the Internet, or can retrieve an email address for sending instructions by email to a human operator at the financial service provider 28.

The instruction generator 44 employs the information stored within a database 16 to generate instructions for the financial service provider 28. To this end, the instruction generator 44 can access data stored within the database 16 which is representative of a login data for accessing an on-line financial service provided by the financial service provider 28. The login of can include a telephone number, user account identifier, password, or any other information necessary for the server 14 to act as the subscriber's proxy in accessing the online financial services provided by the financial service provider 28. Once the instruction generator 44 has established a communication path with the financial service provider 28, the instruction generator 44 may create a set of instructions representative of a request for transferring funds from a CMA account maintained by the subscriber at the financial service provider 28, to transfer these finds to the financial service provider 30 which can be a payroll service provider. As depicted in FIG. 2, in response to the instructions provided by the instruction generator 44, the financial service provider 28 can transfer funds to an account held by the subscriber 12 and maintained by the payroll service provider 30. In response the payroll service provider 30 can deliver a report to CMA provider 28 indicating the receipt of funds. The CMA provider 28 can deliver similar information to the instruction generator 44 for allowing the instruction generator 44 to update the records of the subscriber 12 maintained by the server 14.

Upon receipt of the report from the CMA service provider 28 that funds have been transferred to the service provider 30, the instruction generator 44 can, as depicted in FIG. 2, access database 16 for collecting information necessary for creating a communication path with the payroll service provider 30. Accordingly, the instruction generator 44 may then access an online service provided by the payroll service provider 30 and establish a communication path with the payroll service provider 30. The instruction generator 44, once the communication path has been established can than deliver to the payroll service provider 30 instructions in a format understandable by the payroll service provider 30, that instruct the payroll service provider 30 to create checks for paying the payroll for the small business. Upon receipt of the instructions the payroll service provider 30 can create the necessary checks and deliver the checks as appropriate and may create a record of the transaction that can be delivered to the instruction generator 44 to update the accounts of the subscriber 12.

Upon completion of the payroll transaction the report generator 48 may process the receipt information provided by the CMA provider 28 and the payroll service provider 30 to create a report of the transaction that may, optionally, be delivered to the subscriber 12.

Thus, it can be understood that the systems and methods described herein, including those depicted in FIGS. 1–4 provide an individual or entity with an integrated tool kit for managing a plurality of financial service products. It will further be understood that these systems allow a subscriber to access the server 14 remotely, such as through the Internet, and that the subscriber 12 may enter a single user name and one ID or password and thereby gain access to the application server running on the platform 14.

Figure 5:
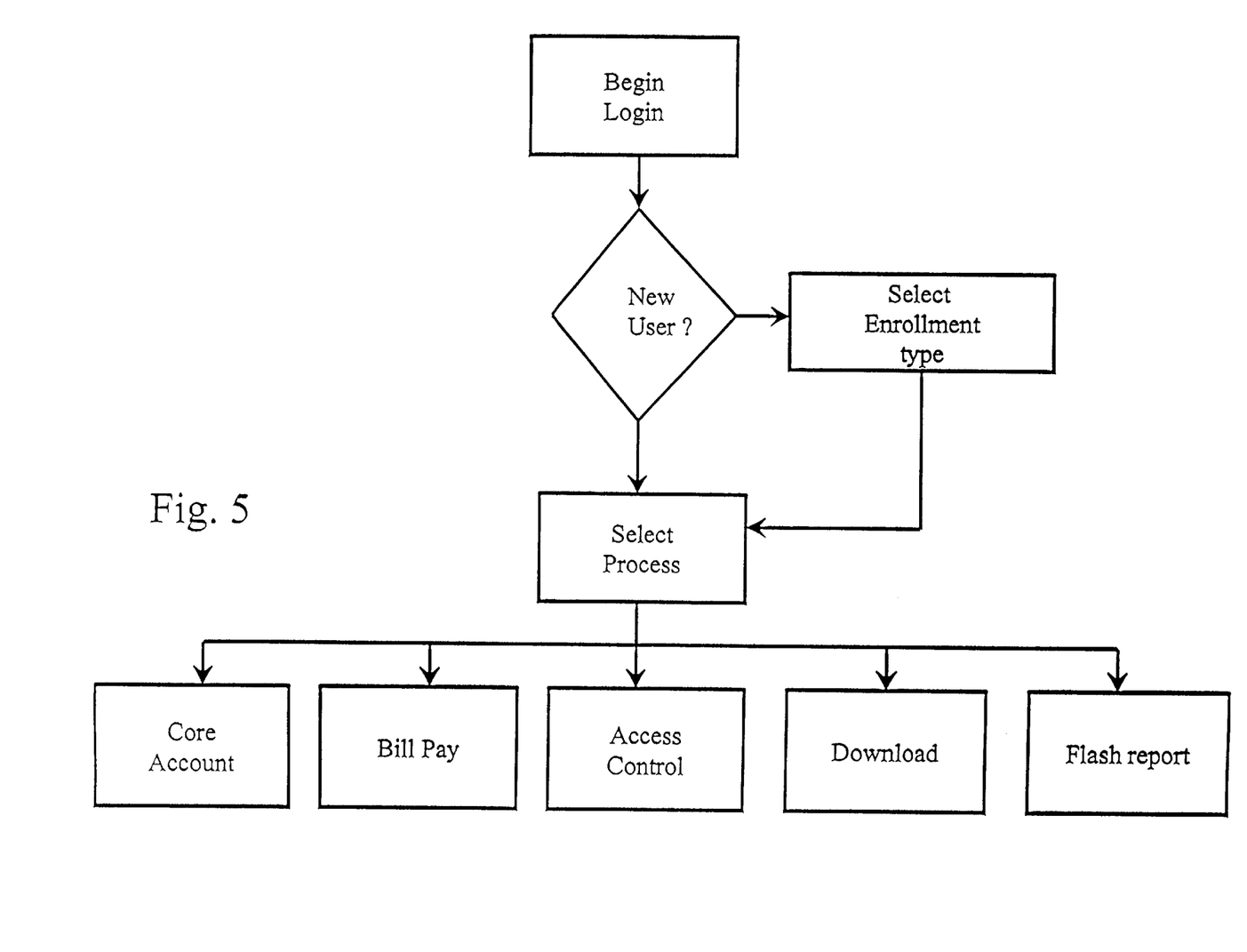
FIG. 5 depicts a flowchart diagram of example operations provided to a subscriber by a system according to the invention.

FIG. 5 shows in more detail the types of operations that a subscriber 12 would employ for initiating an account with the server 14 and for accessing and operating the application platform provided by server 14. Specifically FIG. 5 illustrates that a session between the subscriber 12 and the server 14 begins with a log on wherein the system determines whether or not the subscriber 12 logging on to the system is a new user, or a user that has already registered and therefor has an account. If the server 14 determines that a user is a new user, the web server 40 generates a HTML page that directs the subscriber 12 to enter information about the subscriber 12 for enrolling the subscriber into the system. For example, the web server 40 can generate an HTML page that asks for a user name, credit card number, identification of the type of small business being operated by the subscriber 12, such as a corporate business partnership, sole proprietorship, or trust. Once the server 14 has received the completed form from the subscriber 12, the server 14 can open an account for the subscriber. Once the account is open, the web server 40 may present to the subscriber 12 an HTML page that provides the subscriber 12 with a series of optional financial transactions that the subscriber 12 can activate and direct the server 14 to perform. For example, as shown by FIG. 5 the server 14 can present to the subscriber 12 an HTML page that includes graphical control elements which allow the subscriber 12 to instruct the application server to implement functions related to the subscriber's core account, a bill paying operation, access controls, download functions, or flash reports. For example, the subscriber 12 may select to view and perform transactions in the core account. The core account is or can be a cash management account which combines check writing and debit card services while providing true money market rates of return on all balances. Cash for all business needs such as paying checks or submitting the payrolls can be electronically debited from the core account. The set up, execution, and ongoing management of all financial transactions can be maintained under the control of the subscriber 12 through accessing and controlling the core account through the server 14.

The bill paying operation can be a bill paying procedure implemented by the server 14 that lets the subscriber 12 pay vendors electronically. The system provides ease of use and can track and consolidate the information regarding bill paying right into an account statement. Payments can include remittance information to enable proper crediting of the subscriber 12's accounts with vendors. Additionally, the server 14 can provide an account payroll function. The account payroll service will enable the subscriber 12 to set up and submit payroll information electronically. The subscriber 12 can then perform all standard payroll functions electronically from wherever the subscriber 12 chooses to log in, and at any time the subscriber 12 chooses to log in to the application server.

Additionally, the server 14 allows the subscriber 12 to download information. Specifically, the server 14 allows the subscriber 12 to link the account with an accounting software package maintained by the subscriber 12, for example, at the PC workstation that the subscriber 12 is employing for accessing the server 14. The data can be downloaded to a file on a PC which can then be imported to an accounting package, such as Quicken, or any small business accounting package. Optionally, the server 14 may provide other financial transaction controls such as controls for implementing retirement plans, small business lending, business credit card management, prepaid telephone services, or any other suitable financial transactions.

Figure 6:
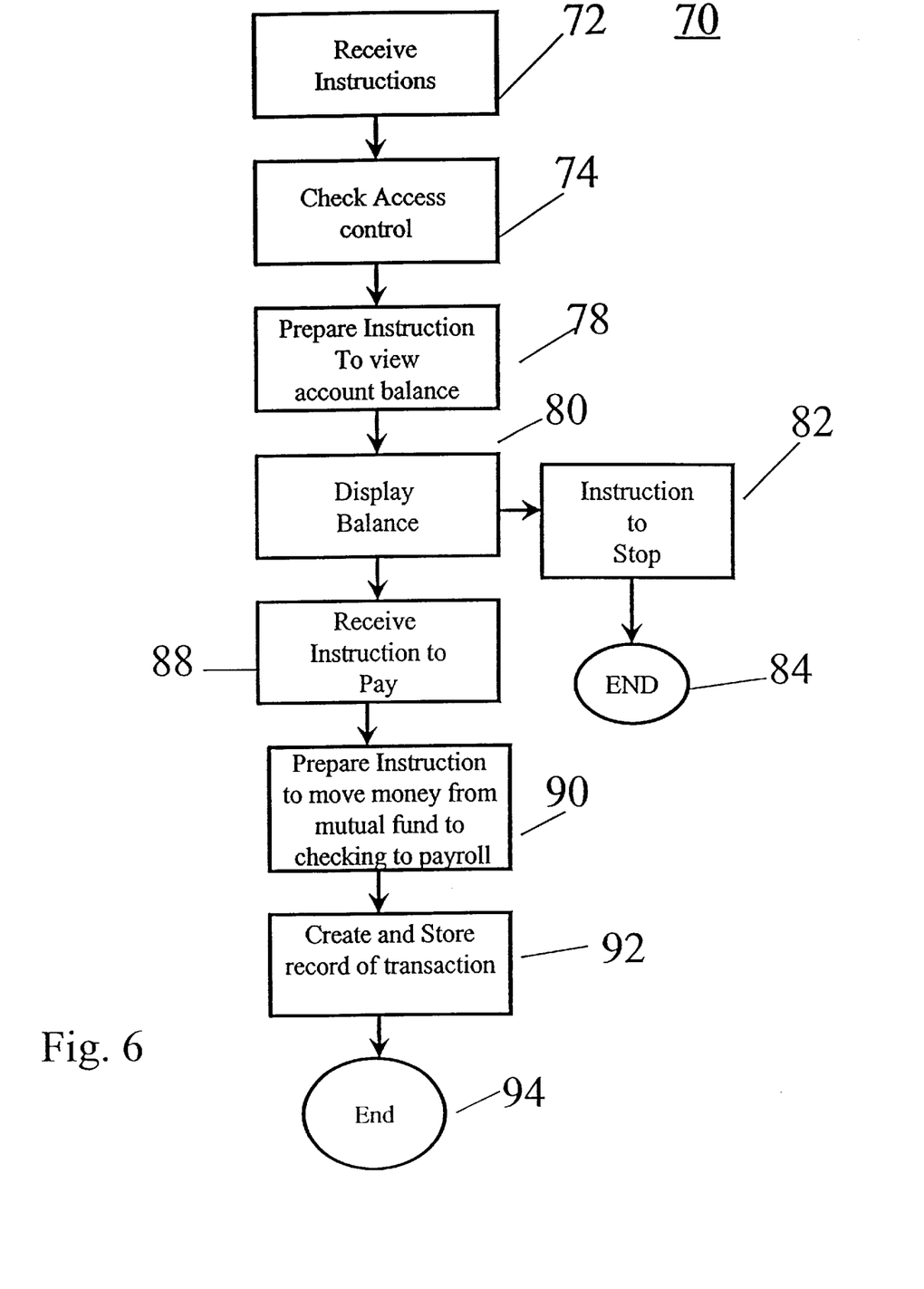
FIG. 6 depicts in more detail one example of a process according to the invention.

Turning to FIG. 6, one example of the operation of the server 14 can be seen. As shown by FIG. 6, a process 70 is illustrated wherein the server 14 in step 72 receives the instructions from the subscriber 12 through the form or through a control activated by the client on the web page provided to the subscriber 12. In one example, the subscriber 12 instructs the server 14 to make payroll. Once the instruction is received by the server 14, the server 14 may in step 74 check an access control. The access control is part of the application server's ability to provide multiple access to a small business owner's accounts by allowing multiple users to share the account. For example, the application server 14 may allow a proprietary user, such as the root user, to set up a plurality of accounts, such as an account for their accountants, CFO or secretary. The small business owner can provide controls that set the access the other user is given. For example, the accountant can be given the control necessary to prepare bills for being paid electronically, however, can lack the necessary level of access to be able to actually kick off electronic payment. Optionally, other access controls can be set up to provide some users with view only control of monies in certain accounts. Other levels of access including read only access and control can be provided. Similarly, a new employee in a company being entered initially by a user with ADMINISTRATOR. Privileges can be enrolled in LTD, STD, health care, payroll deductions, etc. with entry of information. READ ONLY access to the information does not permit changing any information in the system.

Returning to FIG. 6 it can be seen that after the access control is checked, if the access control indicates that the instruction can be proceeded with the process 70 will proceed to the step 78 for preparing an instruction to view the account balance. In this step, the server 14 accesses the data stored in the database 16 to get all information necessary for generating an instruction to the proprietary system which implements the subscriber's 12 core account. For example, the application server can reach into the database 16 to get any information necessary such as tax payer id information, account number information, user name, passwords, or any other information necessary for preparing a data package that can be transmitted electronically over secure lines to the financial service provider that is managing the account from which monies to be taken for paying payroll. As shown in FIG. 6 the first instruction requests information representative of the balance maintained in the account. The financial service provider receives the instruction from the application server and returns information, optionally, in a proprietary format, to the application server. In step 80, the server 14 translates the information provided by the service provider into an HTML page and presents the HTML page to the subscriber 12. The subscriber 12 can view the HTML page to see the subscriber's balance at the service provider. Once the balance is displayed as shown by FIG. 6 the subscriber may decide there is not enough information, or money, to make payroll and issue an instruction to stop, step 82, wherein the process will end at step 82. Alternatively, if enough money is available the subscriber 12 can instruct the process to continue. As shown in FIG. 6, the subscriber 12 can generate an instruction to pay which the server 14 will receive at step 88. Responsive to the instruction to pay, the server 14 will prepare an instruction to move money from, for example, a mutual fund account to a checking account to payroll. Accordingly, the server 14 will get the information from the database for preparing the multiple instructions each of which can be sent to different financial service providers each of which can have different proprietary formats for receiving data. Accordingly, it can be seen that the server 14 implements, in step 90, a plurality of different financial transactions each of which are used for carrying out one composite transaction, such as making payment of payroll. As such, the systems described therein provide the subscriber 12 with a "point and click" functionality for making payroll for their company. Once the instructions to move monies to the proper account and kick off payroll are made, the server 14 can then create and store a record of the transaction which can be maintained in the database 16 depicted in FIG. 1.

The server 14 described herein can be any suitable application program written in any suitable computer language such as C or C++, or any other suitable computer language. The development of such application programs is within the skill of one of ordinary skill in the art. Moreover, it will be understood by those of ordinary skill in the art that, although FIGS. 1 and 2 graphically depict the server 14 and its components as functional block elements, it will be apparent to one of ordinary skill in the art that these elements can be realized as computer programs or portions of computer programs that are capable of running on a data processor platform to thereby configure the data processor as a system according to the invention. Moreover, although FIGS. 1 and 2 depict the server 14 as an integrated unit, it will be apparent to those or ordinary skill in the art that this is only one embodiment, and that the invention can be embodied as a series of distributed computer program, with certain functionality on the distributed across multiple servers and with varying divisions of functionality between the server side and the client side. Additionally, it will be understood that various modifications and extensions of the systems and methods described herein can include server processes that employ use account information to automatically, or at least in part automatically, subscribe the user to other financial services, or to sign the subscriber up with other financial service providers. Thus in one such modified system, the server can provide the subscriber with a form that allows the subscriber to set criteria for when the subscriber would be willing to change service providers. Thus the subscriber can indicate, for example, that the subscriber would be willing to change credit card providers if a new credit card provider could be identified that would provide a credit program meeting certain desired or specified criteria. In this extended system, if such a program is offered by a provider, the server 14 could employ subscriber information, such as names, addresses, tax id and other such information to the new provider, and could transfer account balances, and request new credit cards, all without, or with minimal, subscriber intervention. Thus, it will be understood that the above described systems and processes are merely embodiments of the invention and that other embodiments can be made without departing from the scope hereof.

What is claimed is:

1. A method for allowing an integrated financial transaction, including providing a subscriber with an identifier representative of a subscriber account and a network connection to a server, storing at the server account data associated with said identifier and being representative of account information for accounts maintained by said subscriber at a plurality of different financial service providers, providing said subscriber with a control for initiating from the server an integrated financial transaction for performing a business operation by brokering a transaction between different financial providers to combine a first service provided by a first financial service provider with a second different service provided by a second different financial service provider to create a service different from the first or second service, generating at the server, in response to the subscriber activating said control, a first set of instructions for said first financial service provider to perform said first service, said first set of instructions including instructions for employing said account data to access said accounts maintained by said subscriber at said first financial service provider, generating at the server, subsequent to generating said first set of instructions, a second set of instructions for said second different financial service provider to perform said second different service, said second set of instructions including instructions for employing said account data to access said accounts maintained by said subscriber at said second different financial service provider, and providing from the server said sets of instructions to respective ones of said financial service providers, whereby execution of said second set of instructions is in response to execution of the first set of instructions to coordinate respective operation of said respective ones of said financial service providers to achieve an integrated financial transaction for said subscriber.

2. The method of claim 1, wherein said identifier includes a company identifier.

3. The method of claim 2, wherein said identifier includes a personal identifier.

4. The method of claim 2, wherein said identifier includes a password.

5. The method of claim 1, further including providing a common user interface; and wherein said step of providing said identifier employs said common user interface.

6. The method of claim 1, further including providing a user interface capable of allowing said subscriber to access a plurality of said financial service employed by said subscriber and provided by different financial service providers.

7. The method of claim 1, further including providing a download function for allowing said subscriber to communicate said account data in a selected file format to a client program capable of processing said data in said selected format.

8. The method of claim 1, including, allowing said subscriber to create subaccounts.

9. The method of claim 8, including allowing said subscriber to assign privileges to each of said subaccounts to control access to available financial services.

10. The method of claim 8, including allowing said subscriber to delete subaccounts, thereby preventing a sub-user from accessing available financial services.

11. The method of claim 1, further including collecting user information from said subscriber, and employing said user information for registering said subscriber with additional financial service providers.

12. The method of claim 1, including allowing said financial service provider to unregister said subscriber from financial service providers.

13. The method of claim 1, including, allowing said subscriber to identify criteria for switching between financial service providers, and switching the subscriber accounts from one financial service provider to another financial service provider when the criteria is met.

14. The method of claim 1, wherein said financial service providers are selected from the group consisting of a payroll provider, lending provider, bill paying provider, heath insurance provider retirement plan provider, 401K plan provider, lease provider, bank account provider business merchant card processing provider, and credit provider.

15. The method of claim 1, further including providing a flash report including a first data item and a second data item wherein said first data item is employed by a first one of said financial service providers and said second data item is employed by said second financial service provider different from said first financial service provider.

16. The method of claim 15, further including providing said flash report as a function of said access level.

17. The method of claim 1, including providing one or more privileges for said identifier, each of said one or more privileges having a corresponding access level representative of services available to be accessed.

18. The method of claim 1, wherein said integrated financial transaction comprises a transaction selected from the group consisting of making payroll for a business, securing health insurance for a business, forming a 401K plan for a business, taking a loan for a business, and forming a lease for office space for a business.

* * * * *